United States Patent
Gawlick et al.

(10) Patent No.: US 6,377,953 B1
(45) Date of Patent: Apr. 23, 2002

(54) DATABASE HAVING AN INTEGRATED TRANSFORMATION ENGINE USING PICKLING AND UNPICKLING OF DATA

(75) Inventors: Dieter Gawlick, Palo Alto, CA (US); Samuel Defazio, Hollis; Pankaj Tandon, Nashua, both of NH (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/222,010

(22) Filed: Dec. 30, 1998

(51) Int. Cl.$^7$ .............................................. G06F 17/30
(52) U.S. Cl. ...................... 707/102; 707/101; 707/103; 709/217; 705/10
(58) Field of Search ................................ 707/102, 103; 707/101; 705/10; 709/217

(56) References Cited

U.S. PATENT DOCUMENTS

| | | | | |
|---|---|---|---|---|
| 5,497,491 A | * | 3/1996 | Mitchell et al. | ............ 395/700 |
| 5,893,104 A | * | 4/1999 | Srinivasan et al. | ......... 707/102 |
| 6,012,067 A | | 1/2000 | Sarkar | ........................ 707/103 |
| 6,101,501 A | * | 8/2000 | Breslau et al. | .............. 707/103 |
| 6,112,207 A | * | 8/2000 | Nori et al. | ................... 707/101 |
| 6,121,924 A | * | 9/2000 | Meek et al. | ........... 342/357.13 |
| 6,128,621 A | * | 10/2000 | Weisz | ......................... 707/103 |
| 6,151,584 A | * | 11/2000 | Papierniak et al. | ........... 705/10 |
| 6,151,624 A | * | 11/2000 | Teare et al. | ................. 709/217 |

OTHER PUBLICATIONS

Baldonado et al., An Extensible Constructor Tool for the Rapid, Interactive Design of Query Synthesizers, ACM '998, p. 19–28.*
Jordan, Mick, "An Extensible Programming Environment of Modula–3," ACM SIGSOFT, Dec. 3, 1990, p. 66–76.*
Diederich et al., "Creating Domain Specific Metadata for Scientific Data and Knowledge Bases," IEEE 1991, p. 421–434.*
Defazio et al, "Database Extensions for Complex Domains," IEEE, 1996, p. 200–202.*
Universal Data Option for Informix Dynamic Server, Informix Corporation, 'Online!1998, pp. 1–8, XP002128177, Retrieved from the Internet <URL:http://www.informix.com/informix/techbriefs/udo/udo.pdf>'retrieved on Jan. 14, 2000!the whole document.
Riggs, R. et al.: Pickling state in the Java/sup TM/System, Proceedings from the Second USENIX Conference on Object–Oriented Technologies and Systems (COOTS), Proceedings of the 2nd Conference on Object–Oriented Technologies and Systems (COOTS), Toronto, Ont., Canada, Jun. 17–21, 1996, pp. 241–250, XP002128178, 1996, Berkeley, CA, USA, USENIX Assoc., USA abstract.
Extending Informix—Universal Server: Data Types, Version 9.1, Chapters 1–5, Mar., 1997.

* cited by examiner

*Primary Examiner*—Thomas Black
*Assistant Examiner*—Charles L. Rones
(74) *Attorney, Agent, or Firm*—Hickman Palermo Truong & Becker; Brian D. Hickman

(57) ABSTRACT

A method and system are provided for handling within a database system data items that are associated with data types that are not supported by the database language used to the database system. The data types are registered with the database system by storing, in the database, metadata that indicates the structure, physical layout, and constraints that apply to the data types. The database system uses the structure and physical layout information to access individual elements of data items. The database system validates data items using the constraint information, which includes constraints that dictate what values are valid for certain elements based on what values are supplied for other elements. Data items associated with many different data types may be stored in the same table. Applications can access the data items through a transformation view that transforms the data items from their native format to a format expected by the applications.

33 Claims, 5 Drawing Sheets

DATABASE HAVING AN INTEGRATED TRANSFORMATION ENGINE USING PICKLING AND UNPICKLING OF DATA

FIELD OF THE INVENTION

The present invention relates to database systems and, more specifically, to the use within database systems of data types that are not supported by the database language of the database systems.

BACKGROUND OF THE INVENTION

The data types supported by a database system are generally dictated by the database language through which the database system communicates with external applications. The data types that are supported by the database language of a database system are referred to herein as "supported data types", while data types that are not supported by the language used by the database are referred to as "unsupported data types". Instances of supported and unsupported data types are respectively referred to as supported and unsupported data items.

A popular database language is known as the Structured Query Language (SQL). Numerous versions of SQL have been developed, including SQL92 and more recently SQL3. The types of data supported by SQL generally include scalar types, such as numbers and dates. Relative to other programming environments, such as "C" and "Java", the set of data types supported by SQL is extremely limited. For example, SQL does not provide support for multimedia objects, time series, and spatial data. Thus, difficulties arise when the database systems are used to store data that is created and used by computer programs that were written in those other environments, but which cannot be expressed in the database language understood by the database system.

One environment in which complex data types are prevalent is the electronic commerce ("e-commerce") environment. In the e-commerce environment, numerous standards attempt to dictate the format of complex objects that should be used for exchanging business data. One such standard, referred to as EDI (Electronic Data Interchange), was developed by the Data Interchange Standards Association and has been established as ANSI X12.

An EDI message contains a string of data elements, each of which represents a singular fact, such as a price, product model number, and so forth, separated by delimiters. The entire string is called a data segment. One or more data segments framed by a header and trailer form a transaction set, which is the EDI unit of transmission (equivalent to a message). A transaction set often consists of what would usually be contained in a typical business document or form. The parties who exchange EDI transmissions are referred to as trading partners.

In addition to EDI, certain industries have developed their own industry-specific data format standards. For example, SWIFT (Society for Worldwide Interbank Financial Telecommunication) specifies the data formats and protocol for transferring funds electronically. HL7 (Health Level 7) specifies the data formats and protocol for transferring patient records electronically.

Data definition languages, such as XML (Extensible Markup Language), allow individuals, groups or industries to define data formats that can be used to share data on the World Wide Web, intranets, and elsewhere. For example, a set of companies might agree on a standard or common way to describe the information about a particular type of product that they manufacture. The companies can then use XML to describe a data format for storing the product description information. If the companies store data in the agreed-upon format, then a user may send an intelligent agent (a program) to each company's Web site, gather data, and make a valid comparison.

Difficulties arise when a database system is used to store data that, in its native environment, has a format that is not understood by the database system. One approach to using a database system under these circumstances involves converting each element of the unsupported data type to a data type that is supported by the database system.

For example, a business application (APP1) may expect data to be formatted according to a complex EDI data type ("TYPE1"). The structure of TYPE1, or any of the attributes thereof, may be significantly different than the structure of any data type supported by a database system ("DBS1"). To pass the data used by APP1 to a database managed by DBS1, every attribute of a TYPE1 data item must be transformed to one or more instances of the data types that are supported by DBS1.

Once the data is transformed to data types that DBS1 understands and supports, DBS1 can store and retrieve the data from disk. Likewise, for APP1 to use data from DBS1, the data must by transformed from the structure associated with the data types supported by DBS1 into the structure and format associated with TYPE1.

Referring to FIG. 1, it is a block diagram illustrating the transformation operations that must be performed to allow APP1 to store its data within DBS1. Specifically, a data item generated within APP1 is organized according to the structure and format of TYPE1. To pass the data item into DBS1 for storage, the data item is transformed to data types supported by DBS1 (dbtype1 ... dbtypeN). While in volatile memory within DBS1, the data item is stored as unpickled instances of dbtype1 . . . dbtypeN. DBS1 pickles the instances to store them on disk.

To supply APP1 with data currently stored on disk, DBS1 unpickles the instances of dbtype1 . . . dbtypeN to create unpickled instances of dbtype1 . . . dbtypeN. The unpickled data is then transformed to the structure of the TYPE1 data type before being supplied to the routines within APP1 that manipulate the data item.

To reduce the burden associated with transforming unsupported types whose attributes do not closely correspond to data types supported by a database system, some database systems support a "RAW" data type. From the perspective of the database system, a RAW data item is simply a dump of bytes with no structure. As with other database-supported data types, RAW data items may be stored in the columns of relational tables. Because the database system does not assume any structure to a RAW data item, the RAW data item may be used to store the data for complex unsupported data types that have attributes that are not easily transformed to any data type supported by the database system.

The following statement creates a routine that is internal to the database for invoking an external "manipulate" routine:

create procedure my method(a IN RAW)

The input to this internal routine is a RAW data item, while the external manipulate routine expects a TYPE1 data item. Consequently, the implementation of the my method procedure must take the form:

```
my method(a)
{
raw-to-struct(a)
manipulate
struct-to-raw(a)
}
```

In this example, the my method routine receives a RAW data item "a". The raw-to-struct(a) statement invokes a user-supplied routine that transforms the data item from the RAW format used by the database to store the data item to the TYPE1 format used by APP1. The "manipulate" statement generally represents calls to user-supplied routines that manipulate the TYPE1 data item. After the desired operations have been performed on the data item, the call to struct-to-raw(a) transforms the data item from the TYPE1 structure back to the RAW format used by the database.

Referring to FIG. 2, it is a block diagram illustrating the transformation operations that must be performed to allow APP1 to store its data within a database (DBS1) that supports the RAW data type. Specifically, a data item generated within APP1 is formatted according to "user type1". To pass the data item into DBS1 for storage, the data item is transformed to the RAW data type. While in volatile memory within DBS1, the data item is stored as unpickled RAW data. DBS1 pickles the RAW data to store it on disk.

To supply APP1 with a data item stored in the database, DBS1 unpickles the RAW data item to create unpickled RAW data. The unpickled RAW data is then transformed to the user TYPE1 data type before being supplied to the routines within APP1 that manipulate the data item.

As illustrated by the example, even with database systems that support the RAW data type, the user that creates the unsupported type (the "type implementor") is responsible for providing routines for transforming RAW entities back and forth into their appropriate structured equivalents every time the control is handed over to user routines from the database system. Specifically, in the example given above, the type implementor is responsible for writing the raw-to-struct and struct-to-raw routines.

There are various drawbacks associated with storing data from unsupported types within the database using the techniques described above. Specifically, whether or not the database supports the RAW data type, performing transformations every time data moves back and forth between the database system and external applications is computationally expensive. Further, critical data may be lost during such transformations, for example, when attributes have higher resolution in their native format than they do in the format to which they are transformed for storage in the database system.

Performing transformations every time data moves back and forth between the database system and external applications also raises legal problems. For example, it may be critical to establish that a particular electronic message is an "original". However, after undergoing transformations going into and out of the database environment, the resulting message is no longer identical to the "original" message, and therefore may no longer qualify as being the "original" message.

Based on the foregoing, it is clearly desirable to provide a mechanism that reduces or eliminates the need to perform transformations every time a set of data passes between the database environment and its native environment. It is further desirable to provide a mechanism that allows messages retrieved from a database to be identical to messages originally delivered to the database so that storage within a database does not disqualify a message from being a legal "original".

SUMMARY OF THE INVENTION

A method and system are provided for handling within a database system data items that are associated with data types that are not supported by the database language used to the database system. The data types are registered with the database system by storing, in the database, metadata that indicates the structure, physical layout, and constraints that apply to the data types.

The database system uses the structure and physical layout information to access individual elements of data items. The database system validates data items using the constraint information, which includes constraints that dictate what values are valid for certain elements based on what values are supplied for other elements. Data items associated with many different data types may be stored in the same table.

Applications can access the data items through transformation views that transform the data items from their native format to a format expected by the applications.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing a database system with an integrated transformation engine are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
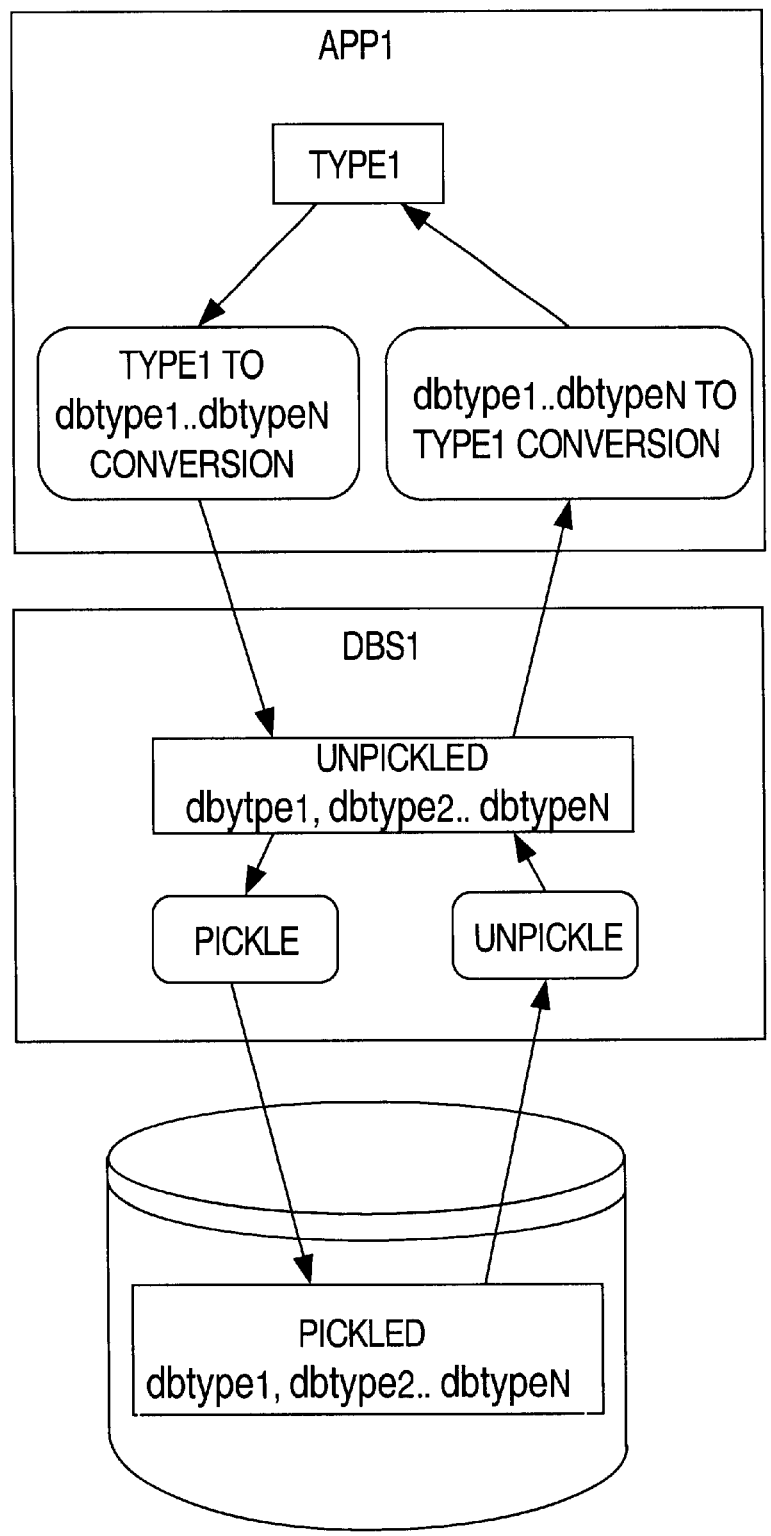
FIG. 1 is a block diagram illustrating the various transformations that occur when an application stores its data using a database system that does not support the data structures used by the application.
Figure 2:
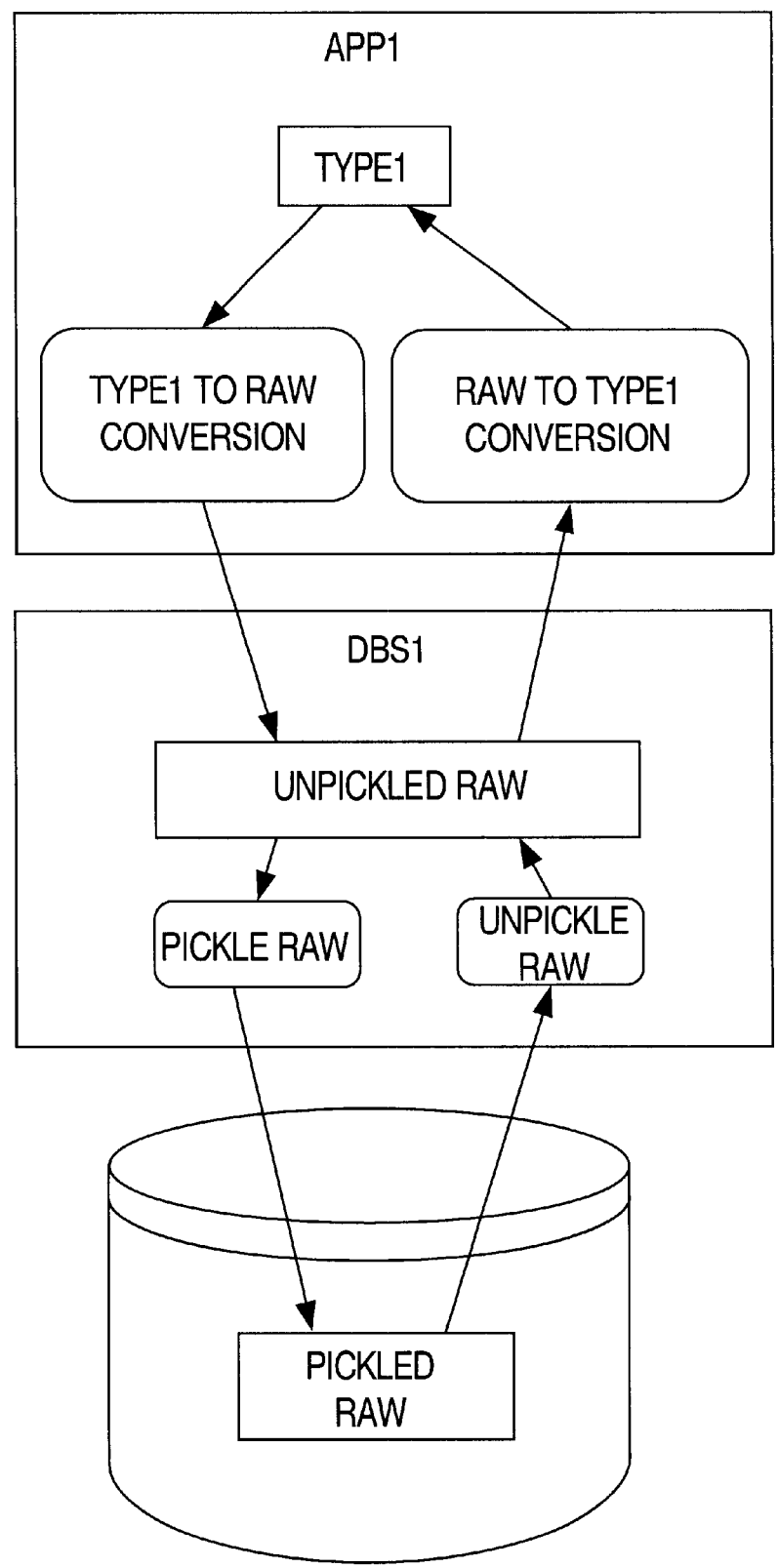
FIG. 2 is a block diagram illustrating the various transformations that occur when an application stores its data using a database system that supports the RAW data type, but does not support the data structures used by the application.
Figure 3:
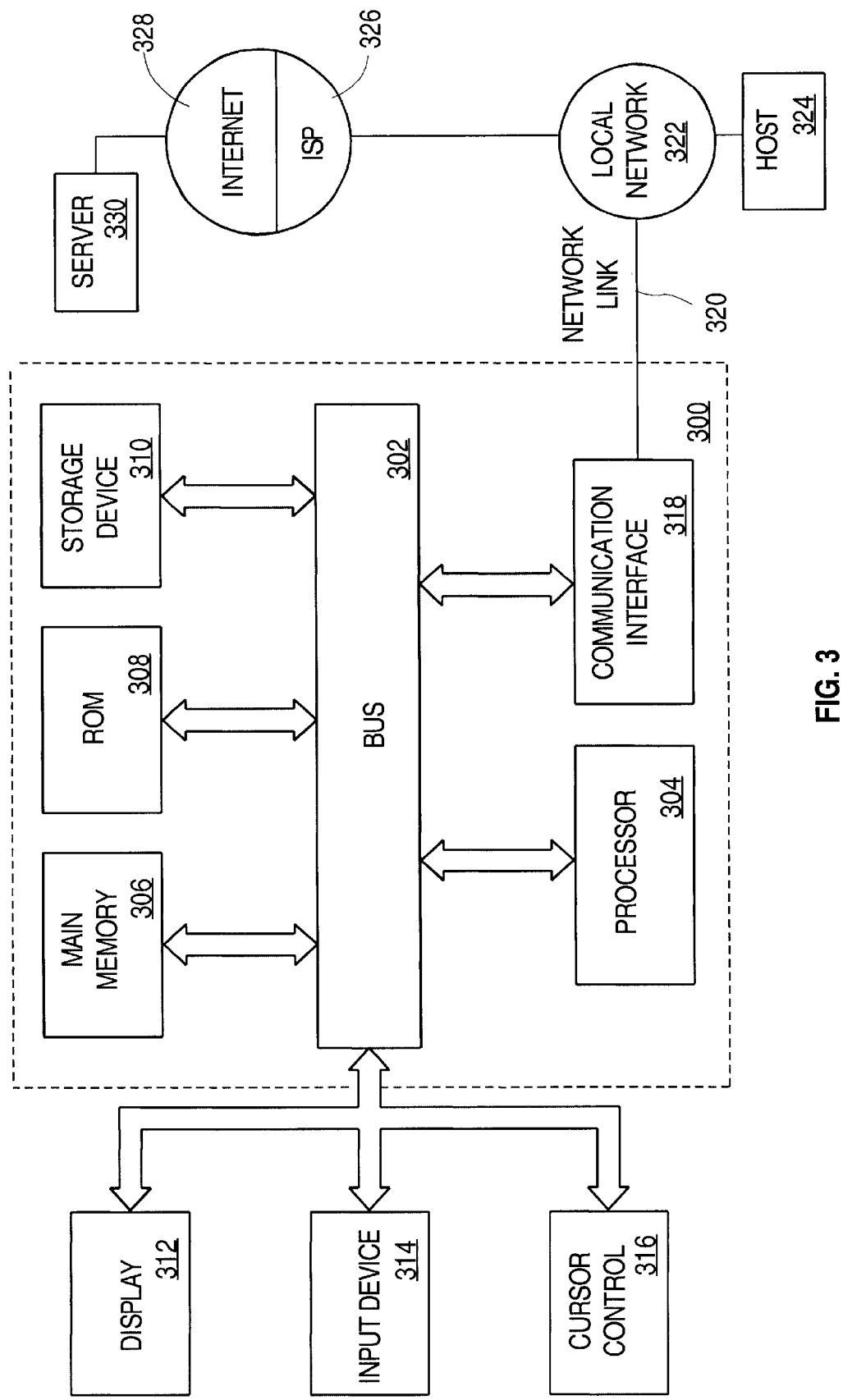
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for storing user-implemented data types in database systems. According to one embodiment of the invention, an integrated transformation mechanism is provided in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to transform the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

Functional Overview

According to one aspect of the invention, data items that belong to unsupported data types are stored within the database system in their native format. As the data items move into and out of the database system, the data items remain in their native format. When external applications desire to see the data items through a particular view, the data items are transformed from their native format to the particular view required by the applications. Thus, transformations are triggered by the need to work on a data item, and not simply in response to the data item being moved or stored within a system.

Type Metadata

According to an embodiment of the invention, metadata about an unsupported data type is stored in the database system when the unsupported data type is registered with the database system. The metadata includes various categories of information about the data type. According to one embodiment, the metadata includes information about the structure of the data type, the physical layout of the various elements of the data type, and constraints that apply to the data type. By reading this data type metadata, the database system is able to understand, validate, and manipulate unsupported data types in their native format.

Structure:

Complex data types are made up of many elements. These elements are also referred to as the "attributes" or "fields" of the data type. Frequently, the elements are arranged in a hierarchy. For example, one element of a particular data type may itself have many elements, and each of those elements may also have many elements. The metadata associated with the structure of a data type typically includes labels or identifiers for each of the elements of the data type, and a description of the hierarchical relationship between the various elements. For example, the structure metadata for a data type DT1 may convey the following structure:

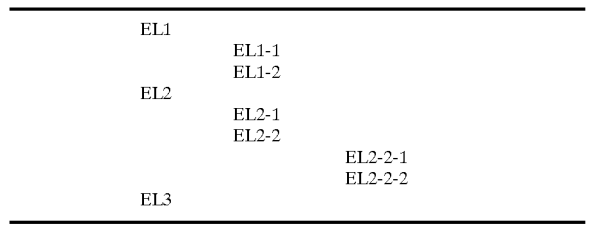

In this example, the data type has nine elements. Three elements are at the first level of the hierarchy, four are at the second level, and two are at the third level.

Physical Layout:

A description of the physical layout of each element of an unsupported data type allows the database system to retrieve, understand, and manipulate unsupported data types on an element by element basis. The physical layout specifies, for example, the length of each element and whether the element is a number, a character string, or some other type of data. For example, the physical layout metadata for DT1 may specify that EL1 is a two-byte integer. The physical layout also indicates when an element has been encoded in a particular manner.

Using the combination of the structure metadata and the physical layout metadata, the database system is able to retrieve and understand individual elements of unsupported data items. Consequently, the database system is able to respond to queries that require analysis of individual elements. For example, knowing that EL1 is the first element of the DT1 data type and that element EL1 is a two-byte integer, a database system is able to respond to the query:

select*from DT1 where EL1<100.

Constraints:

In relational database systems, constraints dictate which values are valid for particular columns. For example, if a non-null constraint is declared for a particular column, then the database system will raise an error when a user attempts to store a row that does not specify a value for that particular column. Similarly, if a foreign key constraint is established between a first column and a second column, then the database system will raise an error when a user attempts to store in a row that specifies a non-null value for the first column that does not match any value in the second column.

According to one aspect of the invention, the concept of constraints is extended to include constraints between the elements of a single data item. Examples of such constraints include:

An "if . . . then" constraint that declares that a non-null value for a first element must be supplied if a non-null value for a second element is supplied. For example, if the EL2 element of a particular DT1 data item is not null, then that particular data item must have a non-null value for element EL2-1.

An "exclusive or" constraint that declares that a non-null value cannot be supplied for a first element if a non-null value is supplied for a second element. For example, if a data item has a non-null value for EL1-1, then that data item cannot also have a non-null value for EL1-2.

A "derivation" constraint that declares that the value of a particular element in a data item is to have a particular arithmetic relationship to values from one or more other elements in that particular data item. For example, the value for EL3 must equal the sum of the values for EL2-1 and EL2-2.

Because the structure of hierarchical data types tends to branch out like a tree, data describing the data types used in e-commerce are generally referred to as the "type trees" of the data types. The type trees for data types used in e-commerce are often extremely complex. However, once they have been created, the type trees are typically made commercially available so that other application developers can more easily develop applications that understand and manipulate instances of the data types.

Exemplary Database System

Figure 4:
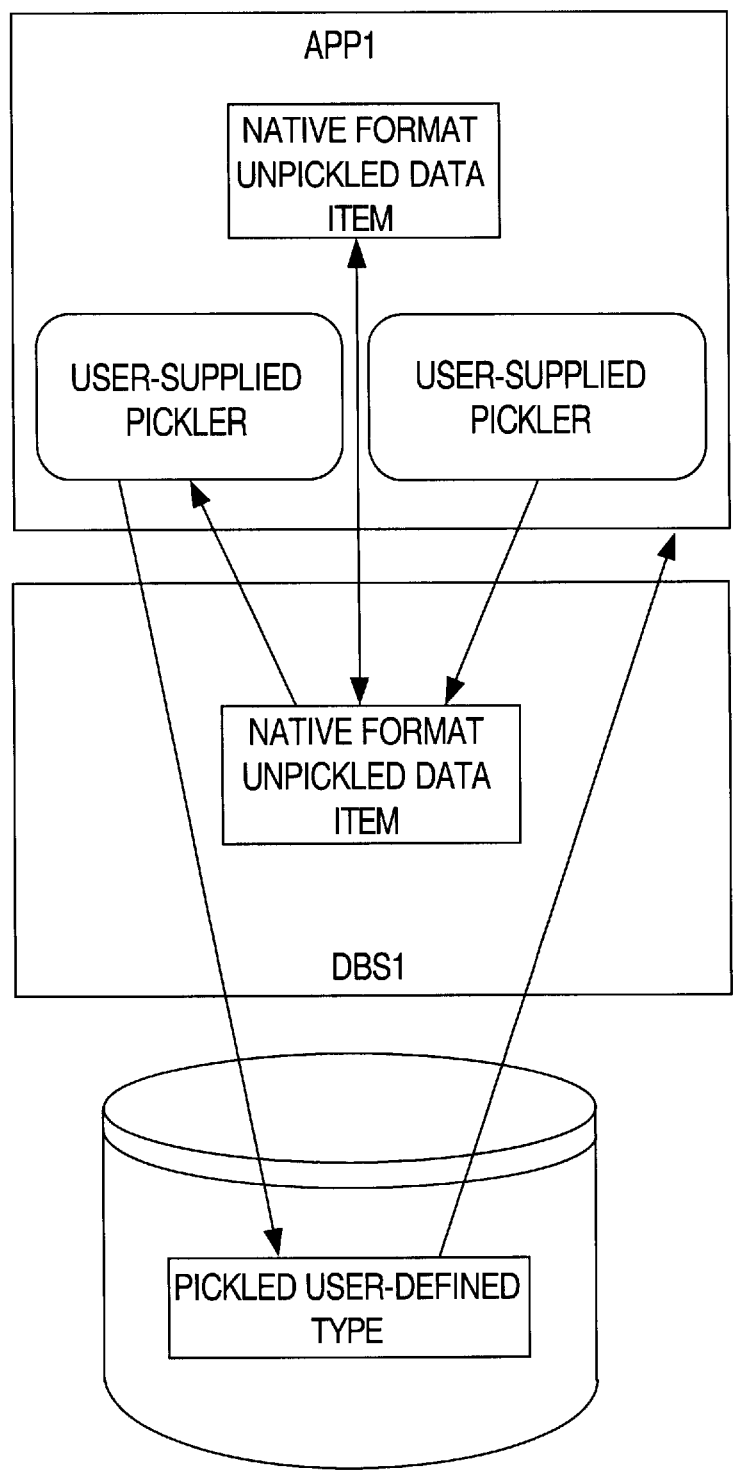
FIG. 4 is a block diagram of a database system that stores type metadata and transformation view metadata according to an embodiment of the invention.

Referring to FIG. 4, it illustrates a database system according to an embodiment of the invention. The database system includes a database environment 402 and a database 404. The database includes a data dictionary 408 and a table 414. The data dictionary 408 stores type metadata 410 and transformation view metadata 412.

Type metadata 410 stores metadata describing the structure, physical layout, and constraints for unsupported data types. This information allows the database system to understand the content of unsupported data items without having to transform the unsupported data items from their native format. For example, as a DT1 data item 420 arrives into the database environment 402 from an external source, it does not undergo a transformation.

Table 414 is a table for storing unsupported data items. The record stored for each data item includes a type identifier and a large binary object (BLOB). The type identifier indicates the data type of the data item, and the BLOB stores the content of the data item. In the illustrated example, data item 420 is stored in record 426 within table 414. Because data item 420 is a DT1 data item, the data type identifier of record 426 specifies data type DT1.

Significantly, table 414 is not restricted to storing records for any particular unsupported data type. For example, record 426 of table 414 stores a DT1 type data item, while record 428 of table 414 stores a DT2 type data item. The DT2 type structure, physical layout, and constraints that apply to DT2 may be completely different than those that apply to DT1. Because the same table is allowed to store items from different data types, the database system need not maintain a separate table for every type of unsupported data type that is registered with the database system. This is particularly valuable for situations in which an extremely large number of unsupported data types have been registered with the database system, but at any given time the database system may be storing few or no data items for each of those registered data types.

The transformation view metadata 412 contains records that indicate specific transformations. The database system uses the transformation view metadata 412 to present information to applications in the format that the applications expect. Transformation view metadata 412 shall be described in greater detail hereafter.

Unsupported Type Validation

After an unsupported data type has been registered with the database system, the type metadata for the registered data type allows the database system to inspect and understand individual elements of instances of that data type. According to one embodiment, this information is used by the database system to validate each data item that belongs to the registered data type prior to storing the data item within the database 404.

In the illustrated example, data item 420 is received by the database system from an external source. In response to receiving data item 420, the database system retrieves the type tree information for data type DT1 from the type metadata 410. Using the type tree information, the database system determines whether all of the constraints associated with data type DT1 are satisfied by data item 420. As explained above, these constraints may include constraint types that are not supported by conventional database systems, such as "if . . . then" constraints, "exclusive or" constraints, and "derivation" constraints.

If data item 420 satisfies the constraints specified in the type tree of DT1, then data item 420 is inserted into table 414. In the illustrated example, data item 420 is inserted as BLOB1 in record 426, and the data type portion of record 426 is set to indicate that record 426 stores a data item of type DT1. If data item 420 did not satisfy a constraint specified in the type tree of DT1, then the database would generate an error message and would not store data item 420 in table 414.

Transformation View Metadata

In conventional database systems, a view is a logical table. As logical tables, views may be queried by users as if they were a table. However, views actually present data that is extracted or derived from existing tables.

A view is defined by metadata referred to as a view definition. The view definition contains mappings to one or more columns in the one or more tables containing the data. Typically, the view definition is in the form of a database query. Columns and tables that are mapped to a view are referred to herein as base columns and base tables of the view, respectively.

A "transformation view" extends the conventional concept of a view. Similar to a conventional view, a transformation view describes how data from the database is to be presented. However, operations required for presenting data in a transformation view involve potentially complex data transformations that convert unsupported data items from their native format to a format associated with the transformation view.

Many applications that manipulate e-commerce data require the data to be presented in a different way than its native structure. For example, a JAVA application expects to be supplied data in a format that is understood by JAVA, while an application written in C expects to be supplied data in a format that is understood by C. The native format of an e-commerce data item may be different than either the Java or C formats. Therefore, when the C application requests the data from the database, the C application specifies a transformation view that causes the e-commerce data to be transformed to the format expected by the C application. Similarly, the Java application retrieves the e- commerce data through a transformation view that transforms the data to the format expected by the Java application.

Figure 5:
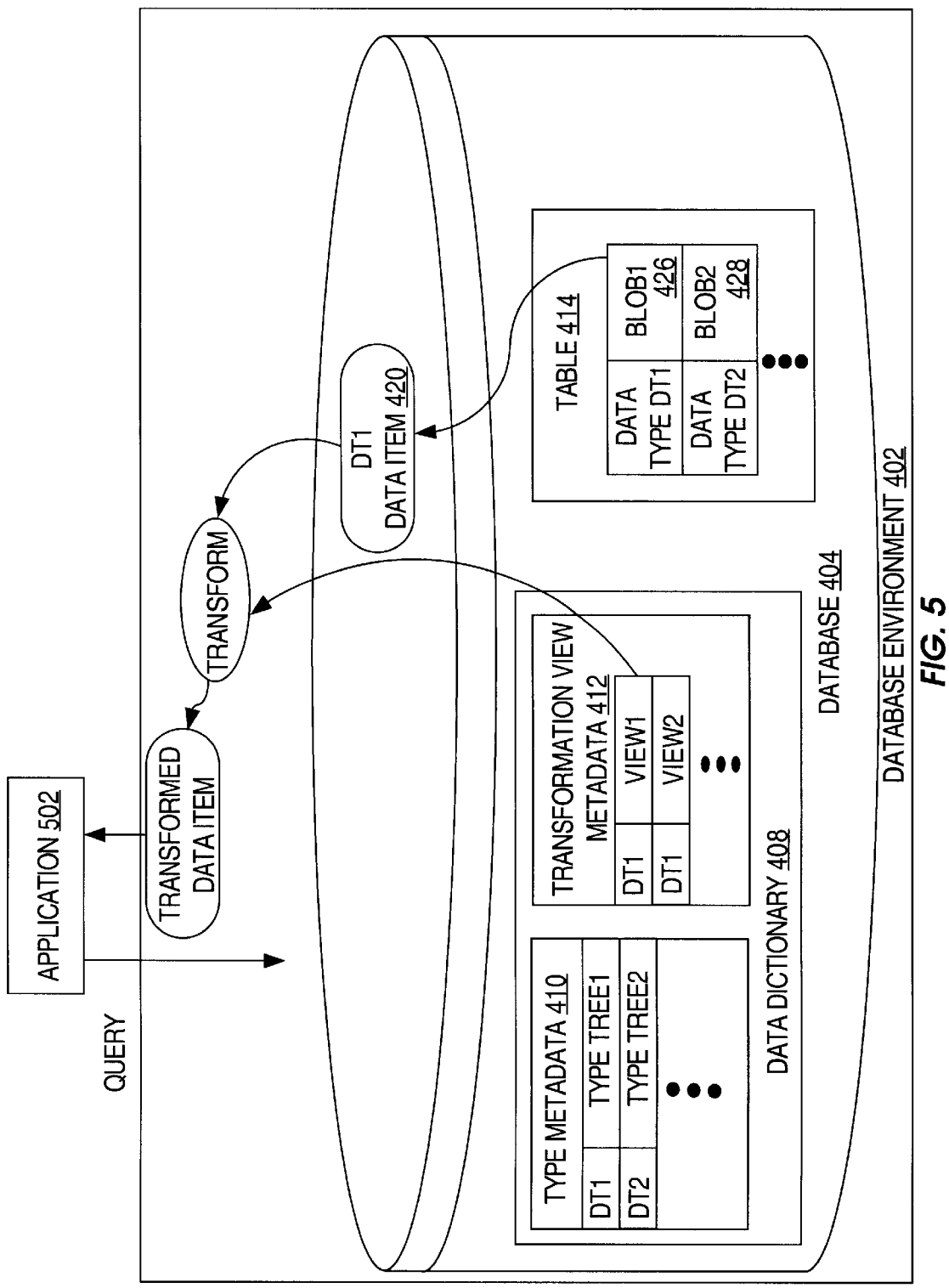
FIG. 5 is a block diagram of the database system show in FIG. 4 that is responding to an application's request to access data through a transformation view.

FIG. 5 is a block diagram illustrating the use of transformation views. An application 502 submits a query to the database system that specifies a view (VIEW1) of DT1 data item 420. The database system retrieves the DT1 data item 420 from table 414 and reads the metadata associated with VIEW1. Based on the VIEW1 metadata, the database system invokes a transformation routine to transform DT1 data item 420. The transformed data item is then provided to application 502.

Thus, as illustrated in FIG. 5, the event which triggers transformation from the format expected by applications occurs at data processing, not at data capturing. According to one embodiment, pickier and unpickler routines used by the database server may incorporate the transformation logic to transform data items between how the data items are represented in the database system (e.g. the EDI structure of an EDI data item) and how they must be presented to a particular user program (e.g. a C-language data structure).

Transformation Routines

As mentioned above, transformation routines have been used to transform unsupported data types to supported data types, and visa versa, as information flows into and out of the database environment. Routines for performing these transformations for many of the data types used in the e-commerce environment are available from Neonsoft and TSIsoft.

According to embodiments of the invention, these same routines may be specified in the metadata for a transformation view. When an application accesses unsupported data through a transformation view, the database system retrieves the data from the database and then invokes the transformation routine specified in the metadata associated with that view. The transformation routine transforms the data from its native format to the format expected by the application, and the transformed data is delivered to the application.

Event-Triggered Operations

As explained above, the introduction of a data item that belongs to an unsupported data type into the database system may trigger a validation operation, during which the database system determines whether the data item satisfies the constraints associated with the unsupported data type. This is one example of an event-triggered operation.

According to one aspect of the invention, numerous event-triggered operations may be established for an unsupported data type. For example, in addition to validating a data item when it arrives within the database system, other state-free operations may be performed. As shall be described in greater detail hereafter, such state-free operations may include executing transformation routines to produce values that are supplied to an indexing mechanism to index the data item.

Indexes on Unsupported Data Types

According to one aspect of the invention, the database system includes a mechanism for building indexes for unsupported data types. Unlike conventional indexes, the unsupported data items used to build the indexes may not all reside in the same table. Further, the data items may reside in the same table as other data items (associated with other unsupported data types) that are not used to construct the index.

For example, an index may be built within database 404 for the DT1 data type, where element EL1 is selected as the primary key of the index. DT1 data items may be dispersed throughout table 414 along with many other types of data items. To initially build the index, all of the tables that store any DT1 data items are scanned. When a DT1 data item is encountered, the value of element EL1 is extracted from the BLOB and an index entry is constructed. The database system is able to extract the value of element EL1 based on the structure and physical layout information stored in the type metadata for DT1.

According to one embodiment, the index entry has the format <EL1val, LOC>, where EL1val is the value of the EL1 element and LOC is data that identifies the location of the record in which the DT1 data item is stored. When it is possible for DT1 data items to be stored in multiple tables, LOC would include a table identifier in addition to a row identifier.

After the DT1 index is initially built, the DT1 index is maintained by updating the index in response to operations on DT1 data items. For example, if a DT1 data item is deleted, the index entry for the data item is removed from the index. Similarly, the insertion of a new DT1 data item into any table of the database results in a new index entry being inserted into the DT1 index.

Any number of indexes may be established for the same unsupported data type. For example, in addition to a DT1 index built on the EL1 element of DT1, database 404 may have a second DT1 index built on the EL2 element of DT1.

Using indexes for unsupported types allows the user think that the database system supports a more extensive type system than it actually supports, while allowing the database system to continue to optimize queries even though the database does not actually understand the data type being accessed by the queries. Thus, the database server does not really know the type, but is able to act as if it understands the data type.

Extensible Indexes for Unsupported Types

According to an embodiment of the invention, the techniques for handling unsupported data types described herein may be used in conjunction with techniques for providing index types that are not inherently supported by the database system. Techniques for using unsupported index types are described in detail in U.S. Pat. No. 5,893,124, entitled "Extensible Indexing", issued Apr. 6, 1999 by Jagannathan Srinivasan, Ravi Murthy, Chin Hong, Samuel DeFazio, and Anil Nori, the contents of which are incorporated herein by this reference.

According to the extensible indexing techniques, a database system is provided in which the responsibility for building, maintaining and interpreting non-native indices is shared between a domain expert that designs the access methods for the non-native index type and the database server. The software provided by the domain expert registers index routines with the database system to extend the indexing capabilities of the database server beyond those built-in to the database system. Indices that are managed by routines supplied in this manner are referred to herein as index objects (since they are instances of the newly defined index types).

Generally, the domain expert creates routines that control the structure and semantic content of a non-native index type ("index routines"), while the database server interacts with the index routines to build, maintain, and employ index objects of the non-native index type. When used with unsupported data types, index routines that are to be used with a particular may be registered as part of the registration of the unsupported data type.

According to one embodiment, when an unsupported item arrives in the database, in addition to executing a validation routine that checks to determine whether the item conforms to the appropriate constraints, a transformation routine is also executed. The transformation routine tells the database server what to do to index the item. A transformation routine that tells the database server how to index a data item is referred to herein as an "index-interface transformation routine".

An index-interface transformation routine tells an index mechanism what type of information from the item should be indexed. According to one embodiment, index-interface transformation routines return zero or more name-value pairs, and supply those name-value pairs to an indexing mechanism that is configured to build and maintain indexes based on name-value pairs.

In the name-value pairs returned by the transformation routine, the "name" may correspond to an attribute name of an attribute that the data item has in its native format, and the "value" is the value that the data item has for that particular attribute. For example, if the data item is of type DT1, the transformation routine may return the ordered pairs <EL1, 'Fred'><EL2, 1045><EL2-1, 43>. This information may then be supplied to the indexing mechanism. The indexing mechanism, in turn, generates index entries that associated these name-value pairs with the data item, and inserts the index entries into one or more indexes.

In addition to invoking an index-interface transformation routine to index a data item when the data item is added to the database system, index-interface transformation routines must also be invoked when indexed data items are updated or deleted. According to one embodiment, upon the update of an unsupported data item, an index-interface transformation routine is invoked to produce two sets of ordered pairs. The first set of ordered pairs indicates the pre-update values of the data item, and second set of ordered pairs indicates the post-update values of the data item. For example, the first set of ordered pairs may be <EL1, 'Fred'><EL2, 1045><EL2-1, 43>, while the second set of ordered pairs is <EL1, 'Fred'><EL2, 99><EL2-1, 43>. In this case, the update changed the value of the EL2 attribute from 1045 to 99.

These two sets of ordered pairs may be fed to the indexing mechanism which, in the present case, would remove the index entry associated with <EL2, 1045> from the appropriate index and would insert an index entry associated with <EL2, 99> into the appropriate index.

Similarly, an index-interface transformation routine may be invoked in response to the deletion of an indexed data item. The index-interface transformation routine produces a set of name-value pairs that may be used by the indexing mechanism to delete index entries associated with the deleted data item.

Significantly, the use of index-interface transformation routines in conjunction with an index mechanism allows unsupported data types to be indexed by a mechanism that neither understands the type system associated with the items that it is indexing, nor how many attributes a type has.

Having indexed selected attributes of unsupported data items, the database server is able to optimize the execution of queries that select those data items based on the indexes. Further, when unsupported index types are used to index the unsupported data items, the server appears to have support for a new type of index and a new type system, when in reality the database system does not really understand either.

The combination of an index mechanism with a server-side transformation engine significantly increases the flexibility of the database system with respect to the type of queries the database system is able to answer. This is particularly true because information that is produced by the transformation routines for the purpose of indexing an unsupported data item is not necessarily the information that is in the data item. Rather, the information produced by the index-interface transformation routines may be derived from the data item, or may simply convey information about the data item.

For example, a particular data type DT may include two collection attributes C1 and C2, and each collection attribute may have any number of members. Assuming that the members of collection C1 are numbers, the transformation engine may be configured to index data item of data type DT based on (1) the average value of the members of C1 and (2) the number of members in C2. To perform indexing based on these values, the index-interface transformation routines for data type DT may, in response to receipt of a data item of type DT, supply to the indexing mechanism name-value pairs that have the form: <AVG, N1><C2MEMS, N2>, where N1 is the average value of members of C1 and N2 is the number of members of C2.

Because the transformation engine is able to return values that are not necessarily contained in a data item, the transformation engine enables the database system to answer queries whose answers require information that is not contained in the data item. For example, assume that a database server is configured to process queries that conform to the SQL database language. The SQL database language supports a limited number of condition types. Standard SQL does not provide a way to select, for example, "all DT data items that have less than two elements in their C2 collection". However, because DT has a transformation routine that produces the number of elements that are in the C2 collection of a DT data item, such a query can be formulated. Such a query might appear as follows:

SELECT*from DT
WHERE C2MEMS<2.

In this query, C2MEMS is treated as an attribute of data type DT. However, as explained above, it is not an actual attribute of DT. Rather, it is information produced by an index-interface transformation routine associated with data type DT, and merely indicates information about data items of type DT.

Value Based Indexing

According to one embodiment of the invention, the transformation engine may be used in conjunction with an indexing mechanism to provide value-based indexes. Value based indexes are indexes that only index data items that satisfy a particular condition. For example, assume that the database is being used to store an unsupported data type named "ORDER". One attribute of the data type ORDER may be COST. To facilitate query processing, the database may build an index on the COST attribute of ORDER data items. However, it may be decided that only ORDER data items that have COST values greater than 100,000 should be indexed. By limiting the index to ORDER data items with costs greater than 100,000, the server will be able to use the index to efficiently process queries that are restricted to ORDER data items with costs greater than 100,000. Queries that are not restricted in that manner, on the other hand, may require a full table scan.

Value based indexing is accomplished by logic within the index-interface transformation routine that produces the name-value pairs that are supplied to the indexing mechanism. In the example given above, the index-interface transformation routine that is executed in response to an ORDER data item entering the database system would be configured to return the name-value pair in the form <COST, N1> (where N1 is the value of the COST attribute) only if the ORDER data item in question has a COST value greater than 100,000. If the ORDER data item does not have a COST value greater than 100,000, no name-value pair for the COST attribute would be supplied to the indexing mechanism. Hence, the data item would not be indexed by its COST attribute.

In the preceding example, the logic within the index-interface transformation routine simply determined whether or not a data item will be indexed on an attribute based on the value of that attribute. However, the index-interface transformation routine may include logic for arbitrarily complex indexing rules. For example, the index-interface transformation routine may incorporate logic to implement the following indexing rules:

if COST>100,000, then index based on all attributes of the ORDER data type;
if 100,000>=COST>10,000, then index based on the COST only;
else do not index.

Value based indexing allows data items that satisfy certain criteria to be retrieved more efficiently than data items that do not satisfy the criteria, based on the presumption that the more indexes that can be used to process a query, the faster the execution of queries that select the data. In effect, the user has the power to determine, through use of the transformation logic that feeds the indexing mechanism, how much effort the database server expends with respect to indexing particular items of information.

Accessing Unsupported Data Types

According to one embodiment of the invention, applications are able to submit queries to retrieve unsupported data items in a manner similar to what is currently used to retrieve data from data types that are supported by SQL. For example, to retrieve elements EL1, EL2 and EL2-1 from all DT1 data items where EL1 is greater than five, an application may submit the following query:

select EL1, EL2, EL2-1 from DT1 where EL1>5

In this example, the data type identifier DT1 is specified in the place of a table name, and element names are specified in the place of column names.

Assuming that no index is available to process this query, the database system would respond to receiving this query by scanning all tables that could possibly include DT1 data items. Upon encountering a DT1 data item, the database system uses the DT1 type information to extract the EL1 value of the data item to determine whether the data item satisfies the search condition EL1>5. If the data item satisfies the search condition, then the database system uses the DT1 type information to extract the EL2 and EL2-1 values, and adds a row containing the EL1, EL2 and E2-1 values to the result set of the query. This process continues until all DT1 data items have been inspected.

If an index has been built on the DT1 data type, then the index may be used to avoid the table scans. Significantly, it may be efficient to use the index even if the index is not built on a key that appears in the predicate of the query. For example, an index built on element EL3 of DT1 may be used to execute a query with the condition EL1>5. Under these conditions, the index entries would simply be used to locate all of the DT1 data items in the database. The benefit of using an index to locate all of the data items of a particular unsupported type may be significant if the data items of that type account for a small percentage of the data items in a relatively large table. According to one embodiment, the database system supports indexes that are not built on any key, but which are merely organized to indicate where data items of a particular unsupported data type are located within the database.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for handling within a database system data items that are associated with an unsupported data type that is not supported by said database system, the method comprising the steps of:
    the database system receiving type metadata for said unsupported data type, said type metadata including data that specifies a structure and a physical layout for one or more elements of said unsupported data type;
    the database system receiving data items of said unsupported data type from one or more external sources and storing, said data items within a database in a native format; and
    the database system using said type metadata to understand and access individual elements of said data items.

2. The method of claim 1 wherein:
    the type metadata further includes constraint information that dictates a set of one or more validity conditions;
    the one or more validity conditions include a condition that a first element of said one or more elements have a particular value based on values of at least one other element of said one or more elements; and
    the method further includes the step of the database system validating a data item of said unsupported data type by determining whether said data item satisfies said set of one or more validity conditions.

3. The method of claim 2 wherein said condition requires the first element to be null if a second element has a non-null value.

4. The method of claim 2 wherein said condition requires said first element to be a non-null value if a second element has a non-null value.

5. The method of claim 2 wherein said condition requires said first element to have a particular arithmetic relationship relative to said at least one other element.

6. The method of claim 5 wherein the step of storing said data items within a database includes storing said data items in a table that also contains data items that do not belong to said unsupported data type.

7. The method of claim 1 further comprising the steps of:
    receiving metadata for a transformation view that specifies a transformation for data items of said unsupported data type;
    receiving a request from an application to access said data items through said transformation view; and
    performing said transformation on said data items prior to supplying said data items to said application in response to said request.

8. The method of claim 1 further comprising the step of building an index within said database for said unsupported data type.

9. The method of claim 8 wherein said index is built on a primary key composed of at least one of said one or more elements.

10. A method for validating a data item within a database system, the method comprising the steps of:
    storing, within a database managed by said database system, type metadata for a data type that includes one or more elements;
    wherein said type metadata includes constraint information that dictates a set of one or more validity conditions;
    wherein the one or more validity conditions include a condition that a first element of said one or more elements have a particular value based on values of at least one other element of said one or more elements;
    receiving the data item from an external source, said data item being associated with said data type; and
    the database system validating said data item by determining whether said data item satisfies said set of one or more validity conditions.

11. The method of claim 10 wherein said condition requires the first element to be null if a second element has a non-null value.

12. The method of claim 10 wherein said condition requires said first element to be a non-null value if a second element has a non-null value.

13. The method of claim 10 wherein said condition requires said first element to have a particular arithmetic relationship relative to said at least one other element.

14. The method of claim 10 further comprising the steps of:
    storing said data item in said database if said data item satisfies said set of one or more validity conditions; and
    generating an error message without storing said data item in said database if said data item does not satisfy said set of one or more validity conditions.

15. A method for handling within a database system data items that are associated with an unsupported data type that is not supported by said database system, the method comprising the steps of:
    the database system receiving data items of said unsupported data type from one or more external sources and storing said data items within a database in a native format;
    in response to the database system receiving said data items, said database system executing an index-interface transformation routine associated with said unsupported data type, said index-interface transformation routine producing data that indicates how said data items should be indexed;
    an indexing mechanism building and maintaining one or more indexes based on said data produced by said index-interface transformation routine; and
    the database system using said one or more indexes to determine which data items of said plurality of data items satisfy queries that access said data items.

16. The method of claim 15 wherein said index-interface transformation routine contains logic that determines how a particular data item should be indexed based on whether said data item satisfies certain criteria, wherein a first data item that satisfies said certain criteria is indexed differently than a second data item that does not satisfy said certain criteria.

17. The method of claim 16 wherein the first data item is indexed based on a first set of attributes of said unsupported data type, and said second data item is indexed based on a second set of attributes of said unsupported data type, wherein said first set of attributes is different than said second set of attributes.

18. The method of claim 15 wherein said index-interface transformation routine produces data that causes said data items to be indexed based on information that is not contained in said data items, but that is derived from values contained in said data items.

19. The method of claim 15 wherein said index-interface transformation routine produces data that causes said data items to be indexed based on information about said data items but not contained in said data items.

20. A computer-readable medium bearing instructions for handling within a database system data items that are associated with an unsupported data type, the instructions including instructions for performing the steps of:

the database system receiving type metadata for said unsupported data type, said type metadata including data that specifies a structure and a physical layout for one or more elements of said unsupported data type;

the database system receiving data items of said unsupported data type from one or more external sources and storing said data items within a database in a native format; and the database system using said type metadata to understand and access individual elements of said data items.

21. The computer-readable medium of claim 20 wherein:

the type metadata further includes constraint information that dictates a set of one or more validity conditions;

the one or more validity conditions include a condition that a first element of said one or more elements have a particular value based on values of at least one other element of said one or more elements; and the instructions further include instructions for performing the step of the database system validating a data item of said unsupported data type by determining whether said data item satisfies said set of one or more validity conditions.

22. The computer-readable medium of claim 21 wherein said condition requires the first element to be null if a second element has a non-null value.

23. The computer-readable medium of claim 21 wherein said condition requires said first element to be a non-null value if a second element has a non-null value.

24. The computer-readable medium of claim 21 wherein said condition requires said first element to have a particular arithmetic relationship relative to said at least one other element.

25. The computer-readable medium of claim 24 wherein the step of storing said data items within a database includes storing said data items in a table that also contains data items that do not belong to said unsupported data type.

26. The computer-readable medium of claim 20 further comprising instructions for performing the steps of:

receiving metadata for a transformation view that specifies a transformation for data items of said unsupported data type;

receiving a request from an application to access said data items through said transformation view; and performing said transformation on said data items prior to supplying said data items to said application in response to said request.

27. The computer-readable medium of claim 20 further comprising instructions for performing the step of building an index within said database for said unsupported data type.

28. The computer-readable medium of claim 27 wherein said index is built on a primary key composed of at least one of said one or more elements.

29. A computer-readable medium bearing instructions for handling within a database system data items that are associated with an unsupported data type that is not supported by said database system, the instructions including instructions for performing the steps of:

the database system receiving data items of said unsupported data type from one or more external sources and storing said data items within a database in a native format;

in response to the database system receiving said data items, said database system executing an index-interface transformation routine associated with said unsupported data type, said index-interface transformation routine producing data that indicates how said data items should be indexed;

an indexing mechanism building and maintaining one or more indexes based on said data produced by said index-interface transformation routine; and the database system using said one or more indexes to determine which data items of said plurality of data items satisfy queries that access said data items.

30. The computer-readable medium of claim 29 wherein said index-interface transformation routine contains logic that determines how a particular data item should be indexed based on whether said data item satisfies certain criteria, wherein a first data item that satisfies said certain criteria is indexed differently than a second data item that does not satisfy said certain criteria.

31. The computer-readable medium of claim 30 wherein the first data item is indexed based on a first set of attributes of said unsupported data type, and said second data item is indexed based on a second set of attributes of said unsupported data type, wherein said first set of attributes is different than said second set of attributes.

32. The computer-readable medium of claim 29 wherein said index-interface transformation routine produces data that causes said data items to be indexed based on information that is not contained in said data items, but that is derived from values contained in said data items.

33. The computer-readable medium of claim 29 wherein said index-interface transformation routine produces data that causes said data items to be indexed based on information about said data items but not contained in said data items.

* * * * *